E. L. FULLER.
INFLATION MECHANISM.
APPLICATION FILED AUG. 16, 1920.
1,419,038.
Patented June 6, 1922.
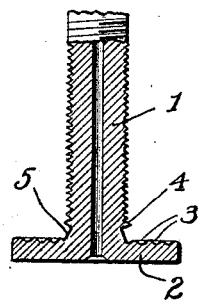
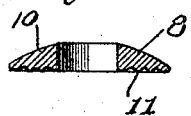
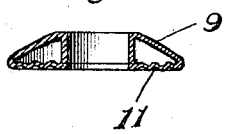
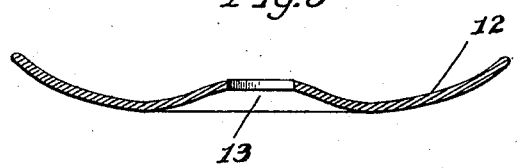
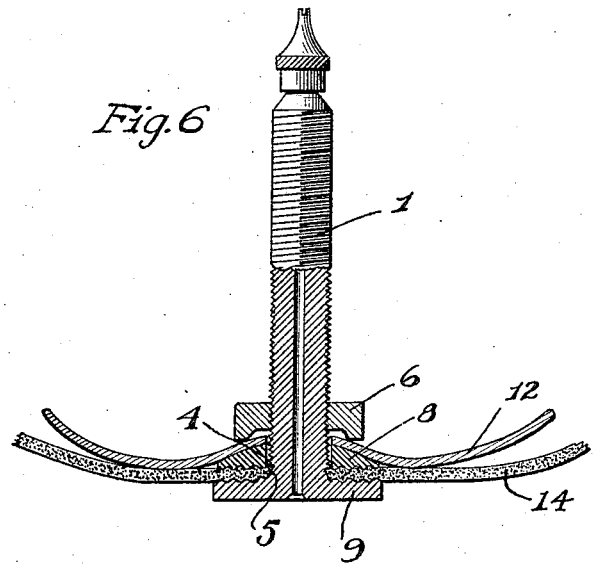
Inventor
Ernest L. Fuller

UNITED STATES PATENT OFFICE.

ERNEST L. FULLER, OF AKRON, OHIO, ASSIGNOR TO THE GOODYEAR TIRE & RUBBER COMPANY, OF AKRON, OHIO, A CORPORATION OF OHIO.

INFLATION MECHANISM.

1,419,038.   Specification of Letters Patent.   Patented June 6, 1922.

Application filed August 16, 1920. Serial No. 403,686.

*To all whom it may concern:*

Be it known that I, ERNEST L. FULLER, a citizen of the United States, residing at Akron, in the county of Summit and State of Ohio, have invented new and useful Improvements in Inflation Mechanisms, of which the following is a specification.

My invention relates to fastening devices for securing inflation valves to inner tubes employed in pneumatic tire casings, and it has for its primary object to provide devices of the above designated character which shall insure an air tight connection between the inner tube and the inflation valve.

Other and ancillary objects will be apparent from a detailed description of my invention in connection with the accompanying drawings in which:

Fig. 1 is a sectional view of a valve stem which carries the valve mechanism.

Fig. 2 is a sectional view of a specially constructed lock-nut employed in accordance with my invention.

Fig. 3 is a sectional view of a washer adapted to cooperate with the base of the valve stem to lock the inner tube therebetween Fig. 4 is a sectional view of a modified form of washer, such as shown in Fig. 3.

Fig. 5 is a sectional view of a spreader which is particularly adapted to be utilized in the assembly of the elements illustrated in the previous figures.

Fig. 6 is a sectional view of an assembly of the elements set forth in Figs. 1 to 5 inclusive.

Difficulty has been experienced in the manufacture of inner tubes in obtaining an air tight connection between the necessary inflation valve and the inner tube, which is provided with an opening to receive the valve stem. This difficulty is in part attributed to the fact that the tubes are often of non-uniform thickness adjacent the valve receiving opening, and as a result a poor connection is established which permits the escape of air. It is of course desirable to maintain an absolutely air tight joint, and the several elements herein described are particularly designed with that in view.

In Fig. 1 is shown a valve stem 1, adapted to carry a valve mechanism of conventional design, which is provided with the usual threaded stem. The valve stem 1 is formed with an integral base 2 which is corrugated, as indicated at 3. The valve stem 1 is also formed with an added corrugated portion 4 adjacent the integral base, the stem being tapered toward the base, as indicated at 5. The purpose of the corrugations adjacent the base of the valve stem and the taper of the stem toward its base will be more fully described hereinafter.

In Fig. 2 is shown a lock-nut 6 which is adapted to be fitted upon the valve stem 1 and is provided with a recessed working face 7.

In Figs. 3 and 4, two designs of washers are shown which both embody the same general principle of construction in that both are provided with a convex surface and a corrugated tube engaging surface. The washer 8 shown in Fig. 3 is formed of a solid section of a suitable metal and differs in this respect from the washer 9, shown in Fig. 4, which is formed of sheet metal. The main features of construction, however, of each of the washers are the convex surface 10 and the corrugated surface 11, the purpose of which will be appreciated from a description of an assembly of the various elements.

In Fig. 5 is shown a spreader 12 which is of any suitable design with the exception of the central portion 13, which is given a concavo-convex form.

The above described elements are assembled to secure an air tight joint between the valve stem 1 and an inner tube 14, as shown in Fig. 6. The tube 14, is of course, provided with an opening through which the base of the valve stem 1 is inserted and drawn into close engagement with the inner surface of the tube. The washer 8 is then disposed about the stem 1 with its corrugated surface engaging the tube 14, and upon which the spreader 12 is diposed with its concave central portion in engagement with the convex surface of the washer. The lock-nut 6 is fitted upon the stem and advanced to engage the spreader and force the spreader and the washer to compress the tube 14 upon the base of the valve stem 1.

The corrugated portion of the stem 1, and particularly the tapered portion adjacent the base, permits the edges of the opening of the tube to move inwardly against the valve stem, and in case ragged edges have been made in forming the opening, these edges are compressed into the corrugations and a close engagement is made with the stem 1. The corrugations on the base of the stem, together with the corrugations on the washer, are, of course, provided to insure a secure fastening of the tube between these two elements. In case the tube is of uneven thickness in the area engaged by the base of the valve stem and the washer, the convex surface of the washer permits it to adjust itself to the uneven surface of the tube and still maintain firm engagement with the spreader and consequently with the lock-nut. The lock-nut is provided with a recessed working face to cooperate with the convex surface of the spreader and washer to further insure a close engagement between these various elements in case an unevenness obtains in the inner tube adjacent the valve-receiving opening.

It will be appreciated, of course, that the corrugated portion adjacent the base of the valve stem need not be given the exact contour of engaging surface illustrated in the drawing to accomplish the purpose desired. However, an irregular surface is provided upon the stem adjacent the base, which is, of course, a departure from the standard design of valve stems.

Although I have shown and described a plurality of elements which may be constructed in a particular manner to secure an air tight joint between an inflation valve and an inner tube for pneumatic tire casings, it is obvious that minor changes may be made in the construction of such elements and in the manner of assembling them, without departing from the spirit and scope of my invention, and I desire, therefore, that no limitations shall be imposed except such as are indicated in the appended claims.

What I claim is:

1. The combination with a valve stem, of a convex washer adapted to cooperate with the base of the stem, and a lock-nut having a concave working face.

2. The combination with a valve stem, of a convex washer, a spreader having a concavo-convex central portion, and a lock-nut having a concave working face.

3. The combination with a valve stem, of a convex washer, a spreader having a concavo-convex central portion, and a lock-nut having a recessed working face.

4. The combination with a valve stem formed with a corrugated base and the stem tapered adjacent the base, of a convex washer having a corrugated face, a spreader formed with a concavo-convex central portion, and a lock-nut having a recessed working face.

5. The combination with a valve stem formed with a corrugated base and the stem corrugated adjacent the base, of a convex washer having a corrugated face, a spreader formed with a concavo-convex central portion, and a lock-nut having a recessed working face.

In witness whereof, I have hereunto signed my name in the presence of two subscribing witnesses.

ERNEST L. FULLER.

Witnesses:
J. E. KEATING,
L. M. HARTMAN.